United States Patent
Suefuji (10) Patent No.: US 8,382,121 B2
(45) Date of Patent: Feb. 26, 2013

(54) DOUBLE MECHANICAL SEAL DEVICE

(75) Inventor: Yoshihiro Suefuji, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 13/002,345

(22) PCT Filed: Jun. 4, 2009

(86) PCT No.: PCT/JP2009/060268
§ 371 (c)(1),
(2), (4) Date: Jan. 3, 2011

(87) PCT Pub. No.: WO2010/001683
PCT Pub. Date: Jan. 7, 2010

(65) Prior Publication Data
US 2011/0101617 A1  May 5, 2011

(30) Foreign Application Priority Data
Jul. 4, 2008 (JP) ................. 2008-175427

(51) Int. Cl.
*F16J 15/54* (2006.01)
(52) U.S. Cl. .............. 277/361; 277/369; 277/370

(58) Field of Classification Search .......... 277/361, 277/369, 370
See application file for complete search history.

(56) References Cited

U.S. PATENT DOCUMENTS

| | | | | |
|---|---|---|---|---|
| 5,490,679 A | * | 2/1996 | Borrino et al. | 277/369 |
| 6,109,617 A | | 8/2000 | Laney | |

FOREIGN PATENT DOCUMENTS

| | | |
|---|---|---|
| JP | 357564 | 3/1991 |
| JP | 2006070942 A | 3/2006 |

* cited by examiner

*Primary Examiner* — Gilbert Lee
(74) *Attorney, Agent, or Firm* — Harness, Dickey & Pierce, PLC (57) ABSTRACT

The present invention provides a cartridge type double seal having a size small enough to be mounted on the outer surface of an apparatus without using a space in a stuffing box and without requiring any special design and modification. In a seal device (1), a seal case (44) is fixed and installed by the set screw (18), screwed in radially inside from the far end of the mounting groove (15) of the seal cover (10) through the screw groove (17), at the innermost end of the seal cover (10). The thickness of thickness direction can be reduced because the seal case (44) is not axially supported and fixed.

6 Claims, 3 Drawing Sheets

DOUBLE MECHANICAL SEAL DEVICE

FIELD

The present invention relates to an outside cartridge type double mechanical seal device which is a double seal in which two seal sliding surfaces are formed back to back, and which is mounted on an outside (outer surface) of the apparatus main body.

BACKGROUND

In a mechanical seal used as a shaft seal for a centrifugal pump, etc., burn-in or breakage of its sliding surfaces may be caused at the time of start-up, since there is no fluid between the sliding surfaces of the mechanical seal due to temporary negative pressure in a stuffing box where the mechanical seal is installed. To solve such a problem, for this type of the mechanical seal, a double mechanical seal (which may be simply referred to as a double seal) is conventionally mounted, and quenching liquid is flowed between two seals, by which the sliding surface is prevented from being dried. Note that the double seal is often used, for example, in the case of preventing inside fluid from leaking outside, or in the case that the inside fluid can be crystallized if it is dried.

As a way of applying the double seal into the shaft seal of the centrifugal pump, etc., a mechanical seal wherein a gland packing is conventionally used may be modified. In this case, the mechanical seal is mounted by using a space in the stuffing box (refer e.g. Japanese Utility Model Publication No. H07-3094 (Patent Document 1)).

SUMMARY

Problems to be Solved by the Invention

However, since the double seal requires a long space in an axial direction, even while using the space in the stuffing box for the double seal, an axial size cannot be secured for the double seal, so that there is any case that the double seal cannot be mounted. Therefore, when the double seal needs to be mounted, the pump itself must be modified to mount, or a specially-designed, expensive mechanical seal must be required.

Also, as a mechanical seal not using the space in the stuffing box, there may be mentioned an outside cartridge type seal device mounted on an outer surface of an apparatus (refer e.g. Japanese Unexamined Patent Publication (Kokai) No. 2003-74713 (Patent Document 2)). However, since the double seal requires an long space in an axial direction as mentioned above, when the double seal is configured as the outside cartridge type seal device, its volume may increase and the size of the seal device also may increase, so that it has been hard to use in practice. Note that, the conventional outside cartridge type seal device shown in Patent Document 2 is a single mechanical seal, not a double mechanical seal.

Patent Document 1: Japanese Utility Model Publication H07-3094

Patent Document 2: Japanese Unexamined Patent Publication (Kokai) No. 2003-74713

The present invention has been made in view of the above problems, and the purpose of the present invention is to provide a widely-usable double mechanical seal device having a size small enough to be mounted on the outer surface of an apparatus without using a space in a stuffing box and without requiring any special design and modification in the apparatus to be mounted.

Means for Solving the Problems

To attain the above problem, a double mechanical seal device of the present invention comprises a rotary ring installed on a rotary shaft so as to rotate together with the rotary shaft, the rotary ring having seal surfaces formed on each of both axial end surfaces; an inside stationary ring arranged at an inside of said rotary ring, the inside stationary ring having a seal surface sealingly contacting and sliding with said seal surface of the rotary ring at an inside end of the rotary ring; an outside stationary ring arranged at an outside of said rotary ring, the outside stationary ring having a seal surface sealingly contacting and sliding with said seal surface of the rotary ring at an outside end of the rotary ring; a seal case axially-movably supporting said inside stationary ring; and a seal cover mounted on an outer surface of an apparatus having said rotary shaft penetrated thereto, the seal cover accommodating said seal case, said inside stationary ring, said rotary ring and said outside stationary ring, and the seal cover axially-movably supporting said outside stationary ring at an outside end of the apparatus; wherein said seal case is supported radially by said seal cover, and installed at an inside end of the seal cover.

According to thus-constituted double mechanical seal device of the present invention, the seal case, conventionally axially supported, can be supported radially and placed in an inside end of a seal cover, so that it is possible to provide a small double mechanical seal device. As a result, it is possible to provide a cartridge type double mechanical seal device without using a space in a stuffing box and without requiring any special design and modification in an apparatus.

Preferably, in the double mechanical seal device of the present invention, said seal cover is provided with an inner bore into which said rotary shaft is penetrated and within which said seal case, said inside stationary ring, said rotary ring and said outside stationary ring are accommodated, and a flange portion having a groove for getting through a member for fixing the seal cover on an outer surface of said apparatus, the groove being cut in from an outer diameter toward an inner diameter of said rotary shaft; and wherein said seal case is radially supported and installed at the inside end of said seal cover by a screw member installed so as to reach said inner bore from an inner diameter side of said groove toward further inner diameter side.

According to thus-constituted double mechanical seal device of the present invention, the seal case is fixed by the screw member from the bottom of the groove for embedded bolt of the seal cover, so that it is possible to support the seal case from radial direction spatially efficiently and surely.

Also preferably, in the double mechanical seal device of the present invention, at least any one of a radial width of a sliding surface between said seal surface of said inside stationary ring and said seal surface at the inside of said rotary ring, and a radial width of a sliding surface between said seal surface of said outside stationary ring and said seal surface at the outside of said rotary ring is formed to be 3 mm or less.

According to thus-constituted double mechanical seal device of the present invention, by making the surface width of the seal sliding surface smaller, the coil spring can be downsized while keeping the same seal pressure, resulting in downsizing the seal device in this respect as well.

Also preferably, in the double mechanical seal device of the present invention, at least any one of balance values of said inside stationary ring and said outside stationary ring is 70% to 130%.

According to thus-constituted double mechanical seal device of the present invention, in the seal portion formed to have the balance value of 70% to 130%, it is possible to seal with same seal property with respect to both positive and negative pressures, so that the seal device having broad utility is attainable.

Also preferably, in the double mechanical seal device of the present invention, said inside stationary ring has an O-ring between an outer circumferential surface of the inside stationary ring and an inner circumferential surface of said seal case at a predetermined place of a back position against said seal surface of the inside stationary ring, and the inside stationary ring is installed so that spaces of both sides of said seal surface are sealed by the O-ring at the position against the seal surface; a diameter of said outer circumferential surface of said inside stationary ring on which said O-ring is attached is approximately same as an inner diameter of a sliding surface between said seal surface of the inside stationary ring and said seal surface of said rotary ring; and a diameter of said inner circumferential surface of said seal case on which said O-ring is attached is approximately same as an outer diameter of a sliding surface between said seal surface of the inside stationary ring and said seal surface of said rotary ring.

According to thus-constituted double mechanical seal device of the present invention, since the balance value of the inside seal ring is formed to be 70% to 130%, it is possible to seal with approximately same seal property even when making the pressure in an intermediate chamber either higher or lower than the inside fluid pressure. Namely, either double seal type seal or tandem type seal can be formed.

Also preferably, in the double mechanical seal device of the present invention, said outside stationary ring has an O-ring between an outer circumferential surface of the outside stationary ring and an inner circumferential surface of said seal cover at a predetermined place of a back position against said seal surface of the outside stationary ring, and the outside stationary ring is installed so that spaces of both sides of said seal surface are sealed by the O-ring at the back position against the seal surface; a diameter of said outer circumferential surface of said outside stationary ring on which said O-ring is attached is approximately same as an inner diameter of a sliding surface between said seal surface of the outside stationary ring and said seal surface of said rotary ring; and a diameter of said inner circumferential surface of said seal cover on which said O-ring is attached is approximately same as an outer diameter of a sliding surface between said seal surface of the outside stationary ring and said seal surface of said rotary ring.

According to thus-constituted double mechanical seal device of the present invention, since the balance value of the outside seal ring is formed to be 70% to 130%, it is possible to seal with approximately same seal property even when making the pressure in an intermediate chamber either higher or lower than the outside fluid pressure.

Also preferably, in the double mechanical seal device of the present invention, at least one of a combination of materials of said inside stationary ring and said rotary ring, and a combination of materials of said outside stationary ring and said rotary ring is a combination of silicon carbide (SiC) and silicon carbide (SiC), a combination of carbon and silicon carbide (SiC), a combination of cemented carbide and cemented carbide, or a combination of carbon and cemented carbide.

According to thus-constituted double mechanical seal device of the present invention, it is possible to provide a seal device, having low abrasion, tolerance at high temperature, broad utility and high durability.

DETAILED DESCRIPTION

A seal device of an embodiment of the present invention will be described in reference to FIG. 1 to FIG. 3.

In the present embodiment, a seal device used as a shaft seal of a centrifugal pump will be exemplified to describe the present invention, thee seal device having a double seal wherein two sliding surfaces are constructed back to back and being mounted in a cartridge form on an outer surface of a stuffing box.

Figure 1:
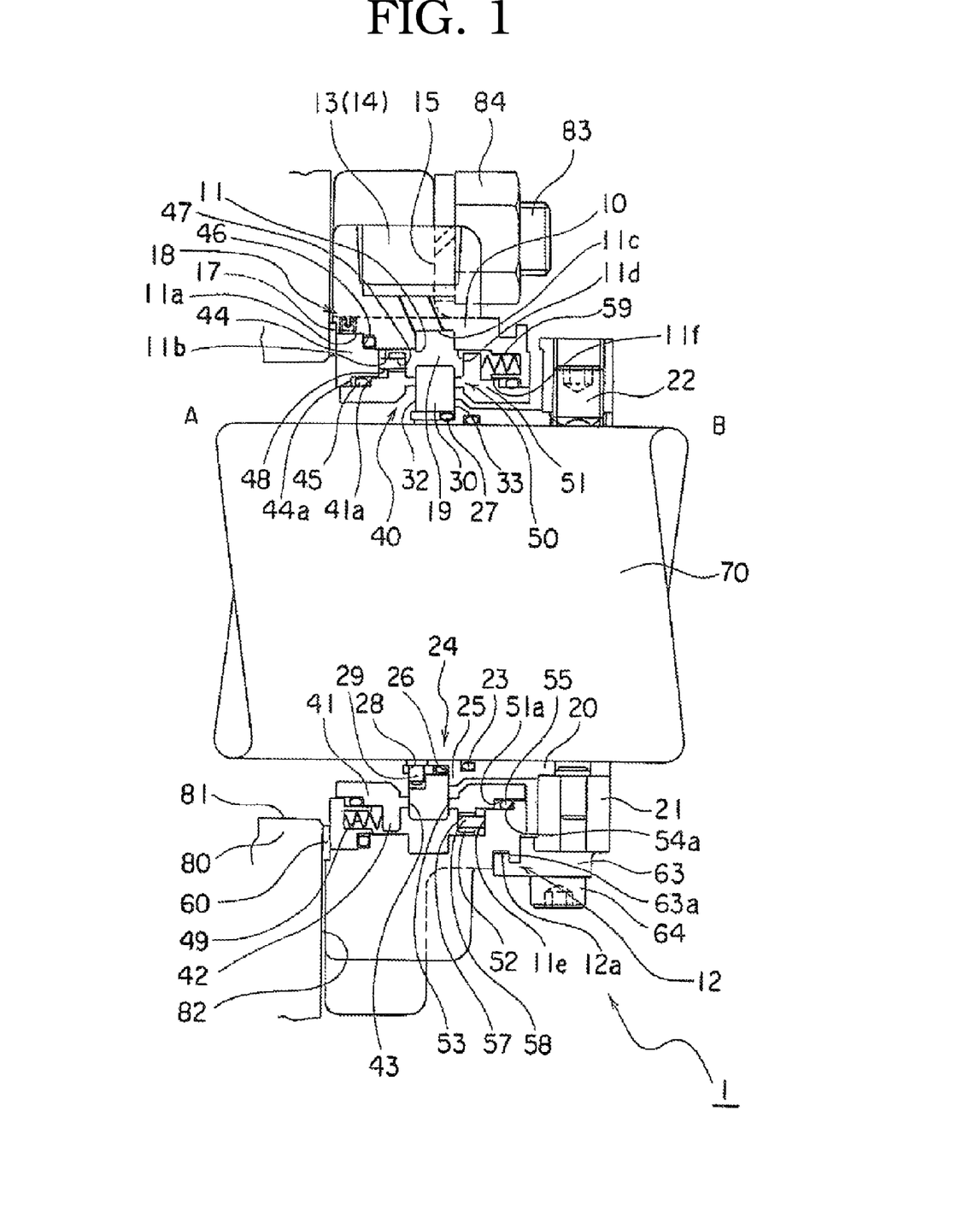
FIG. 1 is a sectional view showing a structure of a seal device of an embodiment of the present invention and a sectional view showing a state in which the seal device is mounted in a stuffing box.

FIG. 1 is a sectional view showing a structure of a seal device 1 of the present embodiment, in which the seal device 1 is mounted as a cartridge on an outer surface 82 of an apparatus main body (stuffing box) 80.

Figure 2:
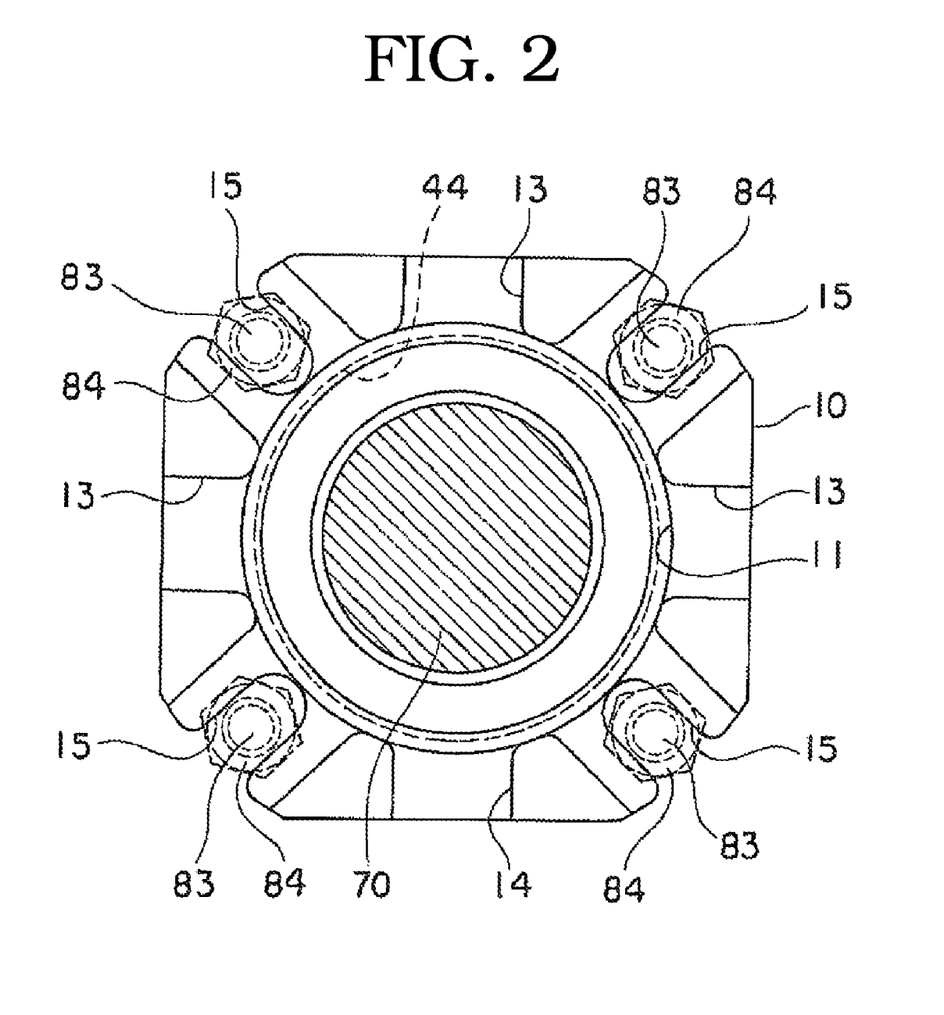
FIG. 2 is a plane view in an axial direction showing a state in which the seal device shown in FIG. 1 is fitted to a rotary shaft.

FIG. 2 is an plane view in an axial direction showing a state in which the seal device 1 shown in FIG. 1 is fitted to a rotary shaft 70.

Figure 3:
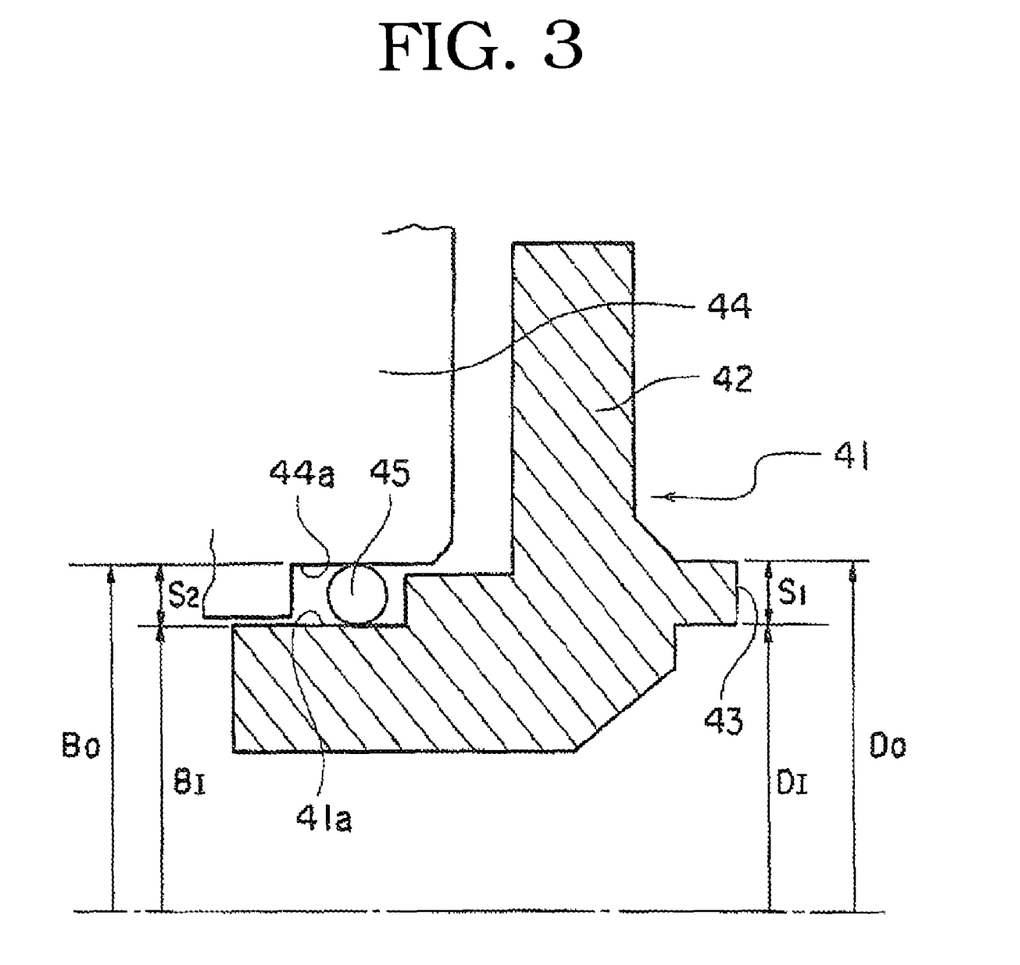
FIG. 3 is a magnified view of a spot where an inside seal ring and a seal case are fitted and set up in the seal device shown in FIG. 1 and a figure for explaining a balance value of the seal device.

FIG. 3 is a magnified view of a spot where an inside seal ring 41 and a seal case 44 are fitted and set up in the seal device 1 shown in FIG. 1, and a view for explaining a balance value of the seal device 1.

As shown in FIG. 1, a shaft bore 81 is formed at the stuffing box 80 of the centrifugal pump, and a rotary shaft 70, rotatably supported by a bearing not shown in the figure, is penetrated into the shaft bore 81. The seal device 1 according to the present invention is mounted on an outer surface 82 around the shaft bore 81 of the stuffing box 80 by an embedded bolt 83 provided on the outer surface 82.

Note that, in FIG. 1, the side of the shaft bore 81 of the stuffing box 80 (left side in the figure) is an inside space A and its opposite side in an axial direction (right side in the figure) is an outside space, i.e. an atmosphere space B.

The seal device 1 comprises a seal cover 10, a sleeve 20, a mating ring 30, an inside seal portion 40 having an inside seal ring 41 and an inside seal surface 32 of the mating ring 30, and an outside (atmosphere-side) seal portion 50 having an atmosphere-side seal ring 51 and an outside seal surface 33 of the mating ring 30.

The axial inside section of the seal cover 10 is formed in a flange shape, and its plane shape is, as shown in FIG. 2, formed in an approximately square shape. In each corner portion of the seal cover 10, an mounting groove 15, cut in from outside of the corner portion toward inside in a diagonal direction, is formed. Four embedded bolts 83 provided at the corresponding positions on the outer surface 82 of the stuffing box 80 are respectively got through these four mounting grooves 15, and each bolt is tightened by nut 84, so that the seal cover 10, i.e. the seal device 1, is mounted on the stuffing box 80.

Within the seal cover 10, an inner bore 11 is formed as shown in FIG. 1, which continues to the shaft bore 81 of the stuffing box 80 to get the rotary shaft 70 therethrough when the seal cover 10 is mounted in the stuffing box 80.

In the surrounding surface of the inner bore 11 (inner circumferential surface of the seal cover 10), a seal case installing surface 11a, a first narrowing surface 11b, an expanding surface 11c, a second narrowing surface 11d and a third narrowing surface 11f are formed in sequence from the inside to the outside.

Also, a positioning portion 12 is formed at an axial outside end section of the seal cover 10. The positioning portion 12 comprises a positioning groove 12a on the outer circumferential surface of the end section of the seal cover 10. When the sleeve 20, the mating ring 30, and the like mentioned later are installed in the rotary shaft 70, a convexed portion 63a of a set plate 63 is engaged into the positioning groove 12a, and a sleeve collar 21 is installed to the rotary shaft 70 in a condition that the set plate 63 is intervened. This allows determining a position of the seal cover 10 with respect to the sleeve collar 21 and the sleeve 20 to have a predetermined positional relation, and as a result, the mating ring 30, and the inside seal ring 41 and outside seal ring 51 are respectively set in a predetermined positional relation.

Also, in the seal cover 10, a screw groove 17 is formed at a far end of the inside in a diagonal direction of each of the mounting groove 15 mentioned above toward further inside in a diagonal direction so that the screw groove 17 is penetrated in the seal case installing surface 11a of the seal cover 10. A set screw 18 is screwed in the screw groove 17 from the side of the mounting groove 15 to the side of the inner circumferential surface, so that the seal case 44 mentioned later is installed on the seal case installing surface 11a of the inner bore 11 of the seal cover 10.

Also, in the seal cover 10, four fluid passages connecting from the outer circumferential surface to the inner bore 11 are formed in radial direction as shown in FIG. 2. The four fluid passages are three quenching liquid inlet passages 13 and a quenching liquid discharge passage 14. In each port of the respective passages 13 and 14, a screw bore for pipe connectable to the pipe, not shown in the figure, is formed. Also, the respective passages 13 and 14 are communicated to an aperture formed on the expanding surface 11c of the inner bore 11 of the seal cover 10, and connected to the intermediate chamber 19 of the seal device 1, the intermediate chamber 19 being surrounded by the inside seal portion 40, the outside seal portion 50 and the inner bore 11 of the seal cover 10.

In such a structure, the quenching liquid injected through the pipe is injected through the quenching liquid inlet passage 13 to the intermediate chamber 19, flowed directly to the outer circumference surfaces of the inside seal portion 40 and the outside seal portion 50, and discharged from the quenching liquid discharge passage 14. This allows cooling heat generated on seal sliding surfaces of each seal portion when sliding, and washing impurities attached to each seal portion.

The seal case 44 is installed on the seal case installing surface 11a of the seal cover 10 by the set screw 18 screwed in the screw groove 17 formed at the far end of the mounting groove 15 of the seal cover 10 as mentioned above. The seal case 44 is installed in the farthest end of the inside of the seal cover 10, i.e. in the farthest end of the seal device 1.

At an outer circumferential corner portion of the outside of the seal case 44, an L-shaped groove is formed circumferentially, and also at a counter corner portion of the inside of the first narrowing surface 11b of the inner bore 11 of the seal cover 10, an L-shaped groove is formed circumferentially. A O-ring 46 is arranged in a circular space with a rectangular cross-section formed by these countered L-shaped grooves, by which the space between the seal cover 10 and the seal case 44 is sealed.

On an inner circumferential side of the seal case 44, the inside seal ring 41 is provided by fitting movably in an axial direction.

Also, On an outside end surface of the seal case 44, a fixing pin 48 is provided, which is projected toward outside in an axial direction and engaged in a guiding groove 47 formed at the flange portion 42 of the inside seal ring 41 mentioned later.

Also, On the same outside end surface of the seal case 44, a plurality of spring seats are circumferentially provided to hold coil springs 49 with a counter surface of the flange portion 42 of the inside seal ring 41 mentioned later.

The inside seal ring 41 is a seal ring for constituting one of the seal surfaces of the inside seal portion 40, and as mentioned above, it is provided on the inner circumferential side of the seal case 44 by fitting movably in an axial direction. The inside seal ring 41 has a seal surface 43 formed on the outside end surface, and this seal surface 43 is slidably and sealingly contact with the inside seal surface 32 of the rotary ring (mating ring) 31 mentioned later to constitute the inside seal portion 40.

On the outer circumferential surface of the inside seal ring 41, a stairs portion 41a having steps in an axial direction is formed. On the other hand, on the inner circumferential surface of the seal case 44, a stairs portion 44a having steps in an axial direction as well is formed so as to face to the stairs portion 41a of the inside seal ring 41 (see FIG. 1 and FIG. 3). These stairs portion 41a and stairs portion 44a form a circular space with a rectangular cross-section, in which O-ring 45 is placed. This allows sealing and fitting the seal case 44 with the inside seal ring 41.

Note that as a material of the O-ring 45, fluorine-contained rubber, nitrile rubber, EPDM, perfluoroelastomer, etc. may be used.

The outer circumferential side of the inside seal ring 41 is formed to the flange portion 42, and the guiding groove 47 is formed in an axial direction in the flange portion 42. The fixing pin 48 provided on the outside end surface of the seal case 44 is inserted in the guiding groove 47. The fixing pin 48 and the guiding groove 47 are in the condition that they are relatively movable in an axial direction, but are rocked together in a circumferential direction, by which the inside seal ring 41 is installed movably in an axial direction to the seal case 44, i.e. the seal cover 10, but nonrotatably in a circumferential direction (rotating direction of the rotary shaft 70).

Also, on the counter surface of the flange portion 42 of the inside seal ring 41 facing against the seal case 44, a plurality of spring seats are circumferentially provided to hold the coil springs 49 with the spring seats formed on the outside end surface of the seal case 44 therebetween. As a result, the inside seal ring 41 is pressed outside in an axial direction, i.e. toward a direction of the mating ring 30.

Also, on the inner circumferential surface side of the inside seal ring 41, a relatively large space is formed between the inner circumferential surface of the inside seal ring 41 and the outer circumferential surface of the rotary shaft 70, so that sealed fluid accommodated in the inside space A can be communicated without solidifying to clog even when the sealed fluid includes slurry.

In the inside seal ring 41 of the present embodiment, surface width of the seal surface (sliding surface) 43 (the length in a radial direction) is formed to be 3 mm or less. It is preferably 1 mm to 3 mm. Also, in some cases, the seal surface 43 may be projected toward a direction of the inside seal surface 32 of the mating ring 30 so as to have a triangle-shaped tip.

Thus, by making the surface width of the seal surface 43 smaller than usual, surface pressure between the seal surface 43 and the inside seal surface 32 can be increased when the pressure of the coil spring 49 to press the inside seal ring 41 toward the direction of the mating ring 30 is same. In other words, for obtaining same surface pressure (seal surface pressure), it is possible to reduce the pressure of the coil spring 49 by making the seal surface width smaller, so that it is possible to use a small spring as the coil spring 49. As a result, it is possible to use a small spring without reducing the seal surface pressure, and the seal device 1 can be downsized.

Also, in the inside seal ring 41 of the inside seal portion 40 of the present embodiment, as shown in FIG. 3, as for the circular space in which the O-ring 45 is arranged, a diameter (outer diameter) $B_I$ of a parallel face to periaxial surface of the stairs portion 41a of the inside seal ring 41, i.e. an inner diameter $B_I$ of the circular space in which the O-ring 45 is arranged, is formed to be equal to an inner diameter $D_I$ of the seal surface 43. Also, a diameter (inner diameter) $B_O$ of a parallel face to periaxial surface of the stairs portion 44a of the seal case 44, i.e. an outer diameter $B_O$ of the circular space in which the O-ring 45 is arranged, is formed to be equal to an outer diameter $D_O$ of the seal surface 43.

By forming as above, a balance value BV for the inside seal ring 41 of the inside seal portion 40, expressed in the following formula (1), becomes 100%, and it is possible to form the seal surface with same seal performance even when either side of the seal surface of the inside seal portion 40 is high in pressure. Namely, the inside seal portion 40 is applicable for both positive and negative pressures. Note that this balance value is not necessarily 100%, and that it is possible to obtain same effect within the range of 70% to 130%.

$$BV = S_2/S_1 \times 100 \tag{1}$$

where $$S_1 = \pi(D_O^2 - D_I^2)/4,$$

and $$S_2 = \pi(B_O^2 - B_I^2)/4.$$

Also, as shown in FIG. 1, the third narrowing surface 11f which is an inner circumferential surface closest to the outside of the inner bore 11 of the seal cover 10 has a smaller inner diameter with respect to the second narrowing surface 11d which is adjacent at the inside to the third narrowing surface 11f, and a section of the third narrowing surface 11f is formed to project in the form of ring toward the direction of the rotary shaft 70. Also, between the second narrowing surface 11d and the third narrowing surface 11f forming the projected portion, a perpendicular surface 11e is formed to be axially perpendicular and to face inside.

On an inner circumferential side of the circular projecting portion having the perpendicular surface 11e and the third narrowing surface 11f, the outside seal ring 51 is installed by fitting movably in an axial direction.

Also, on the perpendicular surface 11e, the fixing pin 58 is provided, in which the fixing pin 58 projects inside in an axial direction, and engages into the guiding groove 57 formed at the flange portion 52 of the outside seal ring 51 mentioned later.

Also, on the outside end surface of the perpendicular surface 11e, a plurality of spring seats are provided circumferentially to hold the coil spring 59 with the counter surface of the flange portion 52 of the outside seal ring 51 mentioned later therebetween.

The outside seal ring 51 is a seal ring for constituting one of the seal surfaces of the outside seal portion 50, and as mentioned above, it is provided on the inner circumferential side of the third narrowing surface 11f of the inner bore 11 of the seal cover 10 by fitting movably in an axial direction. The outside seal ring 51 has a seal surface 53 formed on the inside end surface, and this seal surface 53 is slidably and sealingly contact with the outside seal surface 33 of the rotary ring (mating ring) 31 mentioned later to constitute the outside seal portion 50.

Note that, in the seal device 1 of the present embodiment, the constitution of the outside seal ring 51 is the same as that of the inside seal ring 41. Namely, the inside seal ring 41 and the outside seal ring 51 are symmetrically arranged inside and outside with an axis of the symmetry of the mating ring 30.

On the outer circumferential surface of the outside seal ring 51, a stairs portion 51a having steps in an axial direction is formed. On the other hand, also on the inside of the third narrowing surface 11f of the inner bore 11 of the seal cover 10, i.e. at the corner portion formed by the third narrowing surface 11f and the perpendicular surface 11e, a stairs portion 54a having steps in an axial direction as well is formed so as to face against the stairs portion 51a of the outside seal ring 51. By these stairs portion 51a and stairs portion 54a, a circular space with a rectangular cross-section is formed, in which O-ring 55 is arranged. This allows sealing and fitting the inner bore 11 of the seal cover 10 with the outside seal ring 51 by the O-ring 55 in the condition that they are relatively movable in an axial direction.

Note that as a material of the O-ring 55, fluorine-contained rubber, nitrile rubber, EPDM, perfluoroelastomer, etc. may be used.

The outer circumferential side of the outside seal ring 51 is formed to be the flange portion 52, and the guiding groove 57 is formed in an axial direction in the flange portion 52. The fixing pin 58 provided on the perpendicular surface 11e of the inner bore 11 of the seal cover 10 is inserted into the guiding groove 57. The fixing pin 58 and the guiding groove 57 are in the condition that they are relatively movable in an axial direction, but are rocked together in a circumferential direction, by which the outside seal ring 51 is installed movably in an axial direction to the seal cover 10, but nonrotatably in a circumferential direction (rotating direction of the rotary shaft 70).

Also, on the counter surface of the flange portion 52 of the outside seal ring 51 facing against the perpendicular surface 11e of the inner bore 11 of the seal cover 10, a plurality of spring seats are circumferentially provided to hold the coil springs 59 with the spring seats formed on the perpendicular surface 11e therebetween. This allows the outside seal ring 51 pressing outside in an axial direction, i.e. toward a direction of the mating ring 30.

In the outside seal ring 51 of the present embodiment, surface width of the seal surface (sliding surface) 53 (the length in radial direction) is formed to be 3 mm or less. It is preferably 1 mm to 3 mm. Also, in some cases, the seal surface 53 may be projected toward a direction of the outside seal surface 33 of the mating ring 30 so as to have a triangle-shaped tip.

Thus, by making the surface width of the seal surface 53 smaller than usual, surface pressure between the seal surface 53 and the outside seal surface 33 can be increased when the pressure of the coil spring 59 to press the outside seal ring 51 toward the direction of the mating ring 30 is same. In other words, when obtaining same sliding surface pressure (seal surface pressure), it is possible to reduce the pressure of the coil spring 59 by making the seal surface width smaller, so that it is possible to use a small spring as the coil spring 59. As a result, it is possible to use a small spring without reducing the seal surface pressure, and the seal device 1 can be downsized.

Also, in the outside seal ring 51 of the outside seal portion 50 of the present embodiment, as with the inside seal ring 41 described in reference to FIG. 3, as for the circular space in which the O-ring 55 is arranged, a diameter (outer diameter) ($B_I$) of a parallel face to periaxial surface of the stairs portion 51a of the outside seal ring 51, i.e. an inner diameter ($B_I$) of the circular space in which the O-ring 55 is arranged, is formed to be equal to an inner diameter ($D_I$) of the seal surface 53. Also, a diameter (inner diameter) ($B_O$) of a parallel face to periaxial surface of the stairs portion 54a of the third narrowing surface 11f of the inner bore 11 of the seal cover 10, i.e. an outer diameter ($B_O$) of the circular space in which O-ring 55 is arranged, is formed to be equal to an outer diameter ($D_O$) of the seal surface 53.

By forming as above, a balance value for the outside seal ring 51 of the outside seal portion 50 becomes 100%. Note that this balance value is not necessarily 100%, and that it is possible to obtain same effect in the range of 70% to 130% in the present invention.

The mating ring (rotary ring) 31 comprising respective counter seal surfaces 32 and 33 of the inside seal portion 40 and the outside seal portion 50 is fitted and mounted on the sleeve 20 which is also fitted and installed on the rotary shaft 70.

The sleeve 20 is closely fitted on the surrounding surface of the rotary shaft 70 via O-ring 23, and is fixed to the rotary shaft 70 at the outside end thereof by the sleeve collar 21. The sleeve collar 21 is fitted on the outer circumferential surface of the outside end of the sleeve 20, and is fixed to the rotary shaft 70 by the set screw 22. This allows the sleeve 20 and the sleeve collar 21 to be integrally mounted and fixed to the rotary shaft 70. The mating ring 30 is fitted to the inside end of the sleeve 20.

The inside end of the sleeve collar 21 is formed as the mating ring mounting portion 24 to which the mating ring 30 is fitted and mounted.

The mating ring mounting portion 24 of the sleeve 20 has a projection portion 25 determining the position of its outside end by abutting against the mating ring 30, an O-ring 27 interposing between the mating ring mounting portion 24 and the inner circumferential surface of the mating ring 30 fitted therein, a groove 26 to intervene the O-ring 27, a knock pin 29 for preventing the mating ring 30 fitted into the sleeve 20 from falling off and for determining its inside position, and a bore 28 to which the knock pin 29 is engaged.

The sleeve 20 and the sleeve collar 21 constituted in such a way are, as mentioned above, positioned by the set plate 63 and mounted. On the outer circumferential section of the outside of the seal cover 10, positioning grooves 12a are formed, and a plurality of set plates 63 are arranged to equally distribute along the positioning groove 12a to fit convexed portion 63a of the set plate 63 into the positioning groove 12a. Each set plate 63 is provided and fixed by the socket bolt 64.

By positioning the sleeve collar 21 to the set plate 63, the set plate 63 and the sleeve collar 21 have predetermined positional relation, and relative positional relation between the seal cover 10 to which the set plate 63 is mounted and the sleeve 20 integrally constituted with the sleeve collar 21 is desirably set. As a result, the mating ring 30 mounted on the sleeve 20, and the inside seal ring 41 and the outside seal ring 51 mounted on the seal cover 10 are set at desired positional relation; and the inside seal portion 40 and the outside seal portion 50 are constituted, in which the seal surface 43 of the inside seal ring 41 and the inside seal surface 32 of the mating ring 30, and the seal surface 53 of the outside seal ring 51 and the outside seal surface 33 of the mating ring 30 are respectively in sealingly contact and slide each other with the respective predetermined positional relations and at predetermined pressure.

The mating ring 30 is sealingly fitted on the above mentioned mating ring mounting portion 24 at the inside end of the sleeve 20, in the condition that both sides thereof in an axial direction are determined by the projection portion 25 and the sleeve collar 21, and the condition that the O-ring 27 is interposed against the outer circumferential surface of the sleeve 20, that is, at the predetermined position on the sleeve 20, i.e. on the rotary shaft 70.

The inside end surface of the mating ring 30 is formed to the inside seal surface 32 for sealingly contacting to and sliding with the seal surface 43 of the inside seal ring 41, and constitutes a part of the inside seal portion 40.

On the other hand, the outside end surface of the mating ring 30 is formed to the outside seal surface 33 for sealingly contacting to and sliding with the seal surface 53 of the outside seal ring 51, and constitutes a part of the outside seal portion 50.

An outer circumferential side space of the mating ring 30, i.e. a space surrounded by the outer circumferential surface of the mating ring 30, the outer circumferential surface of the inside seal portion 40, the outside end surface of the seal cover 10, the first narrowing surface 11b, the expanding surface 11c, and the second narrowing surface 11d of the seal cover 10, and the outer circumferential surface of the outside seal portion 50, forms an intermediate chamber 19 of the seal device 1.

To the intermediate chamber 19, the quenching liquid inlet passage 13 and the quenching liquid discharge passage 14 formed on the seal cover 10 are communicated, as mentioned above, and the intermediate chamber 19 is filled with quenching liquid at predetermined pressure, and is constituted in a manner that a flow of the quenching liquid flows on the outer circumferential surfaces of the inside seal portion 40 and the outside seal portion 50. This allows cooling heat generated on the seal sliding surface of each seal portion when sliding, and washing impurities attached to each seal portion.

Note that, for the use as an ordinary double seal, pressure of the intermediate chamber 19 is set higher than pressure of the inside space A, while the seal device 1 of the present embodiment can work even when the pressure of the intermediate chamber 19 is lower than the pressure of the inside space A. The pressure of the intermediate chamber 19 may be properly determined depending on the usage of the seal device 1, purpose, the kind of sealed fluids, etc.

Also, the seal device 1 of the present embodiment comprises a gasket 60 interposed between the outer surface 82 of the stuffing box 80 and the inside end surface of the seal cover 10 when mounting the seal cover 10 into the stuffing box 80. The gasket 60 is made of resin or metal, and prevents the sealed fluid of the inside space A from leaking from between the seal cover 10 and the stuffing box 80.

In the seal device 1 of the present embodiment, the mating ring 30, the inside seal ring 41 and the outside seal ring 51 are respectively made of materials such as silicon carbide (SiC), carbon and cemented carbide. Preferably, a combination of materials of the inside seal ring 41 or the outside seal ring 51 and the mating ring 30 is respectively a combination of silicon carbide (SiC) and silicon carbide (SiC), a combination of carbon and silicon carbide (SiC), a combination of cemented carbide and cemented carbide, or a combination of carbon and cemented carbide.

As mentioned above, according to the seal device 1 of the present embodiment, a double mechanical seal device can be realized in a cartridge-type seal device without using the inside space of the stuffing box 80. Therefore, according to the seal device 1 of the present embodiment, irrespective of the size of the stuffing box 80, further without any special design and modification on the apparatus, a double seal can easily be applied to a desired apparatus such as a pump.

Concretely, in the seal device 1, the seal case 44 is mounted and fixed at the innermost end in an axial direction of the seal cover 10 by the set screw 18 screwed from the far end of the mounting groove 15 of the seal cover 10 through the screw groove 17 toward radially inside. In the conventional seal device, the seal case 44 having a function of determining an axial position of the inside seal ring 41 is supported and fixed in an axial direction in order to make its mounted position obvious, so that a certain length is required in length direction. However, in the seal device 1 of the present embodiment, since the constitution such that the seal case 44 is supported and fixed in a radial direction can be taken, it is possible to decrease the thickness of the seal device 1 in thickness direction (axial direction).

Also, in the seal device 1 of the present embodiment, the surface widths of the seal surface 43 and the seal surface 53 of the inside seal ring 41 and the outside seal ring 51 are formed to be 3 mm or less, more preferably 1 to 3 mm. Consequently, even when using small springs as the coil spring 49 and the coil spring 59, the surface pressures of the seal sliding surfaces can properly be maintained. Therefore, also in this regard, the device can be downsized without deterioration of the seal performance.

More concretely, in the seal device 1 of the present embodiment, it doesn't use the space in the stuffing box 80, and it accommodates the double seal comprising the inside seal portion 40 and the outside seal portion 50 therein, nevertheless its thickness in an axial direction can be 50 mm or less.

Note that, though possible shaft diameter of the rotary shaft 70 is not limited to any specific value and can be any shaft diameter, if it is within a range between at least 20 mm to 100 mm, it is possible to realize the seal device 1 having the thickness of 50 mm or less due to the same constitution.

Also, working pressures of respective seal devices 1 in those cases are preferably 2 MPa or less, more preferably, for example, 1.5 MPa or less.

Also, the seal device 1 of the present embodiment is, as mentioned in reference to FIG. 3, in the inside seal ring 41 of the inside seal portion 40, constituted in the condition that the inner diameter $B_I$ of the circular space in which the O-ring 45 is arranged is equal to the inner diameter $D_I$ of the seal surface 43, and also constituted in the condition that the outer diameter $B_O$ of the circular space in which the O-ring 45 is arranged is equal to the outer diameter $D_O$ of the seal surface 43, and, as a result, constituted in the condition that the balance value (balance ratio) of the inside seal ring 41 adjusted approximately 100%. Therefore, even when either side of the seal surfaces of the inside seal portion 40 is higher in pressure, the seal surfaces can be maintained in the same seal performance. Namely, for both positive and negative pressures, further for the case that the pressure of the quenching liquid is either larger or smaller than the fluid pressure in the inside space A, it can be used with approximately same seal performance, so that is possible to realize a double seal having broader utility.

Namely, in the seal device 1 of the present embodiment, a cartridge-type double seal which is small enough to be mounted on the outer surface of the apparatus, can be realized without using the inside space of the stuffing box 80 and without requiring any special design and modification in the apparatus.

Note that, the embodiment mentioned above is for easier understanding of the present invention, and the present invention is not limited thereto. Each element disclosed in the present embodiment includes any design change and equivalent within the technical scope of the present invention, and can arbitrarily, preferably and variously be modified.

For example, the shapes, the constitution for mounting, and the like of the inside seal ring 41 and the outside seal ring 51 may arbitrarily be modified.

For example, these balance values, which is approximately 100% in the present invention, may slightly be modified. For example, when the balance value is within the range of 70% to 130%, it is possible to substantially obtain the same effects as in the embodiment mentioned above, so that this may be included in embodiments of the present invention.

Also, as a method for changing the balance value, the structure of the arranging place for the O-ring 45 or O-ring 55 may be modified, and the surface width of the seal surface 43 or the seal surface 53 and its radial position of the installed place may be modified.

Also, in the embodiment mentioned above, the inside seal ring 41 of the inside seal portion 40 and the outside seal ring 51 of the outside seal portion 50 are seal rings having same constitution and being symmetrically arranged in an axial direction to the mating ring 30 as the axis of symmetry. However, the inside seal ring 41 and the outside seal ring 51 may have different constitutions. For example, when the seal device 1 is used in the atmosphere, the outside seal ring 51 can be always higher pressure at the side of the intermediate chamber 19, and the outside seal portion 50 does not need to deal with both positive and negative pressures, so that the balance value may be modified from 100%.

INDUSTRIAL APPLICABILITY

The present invention is applicable in a shaft seal of a centrifugal pump, etc. Also, the present invention can be applied as a shaft seal device of its rotary shaft in any other device having a rotary shaft.

The invention claimed is:

1. A double mechanical seal device, for an apparatus having a shaft bore into which a rotary shaft is penetrated, said double mechanical seal device being mountable on an outer surface surrounding said shaft bore of said apparatus without using space in said apparatus, said double mechanical seal device comprising:
    a rotary ring mounted on said rotary shaft so as to rotate together with the rotary shaft, the rotary ring having seal surfaces formed on each of both axial end surfaces;
    an inside stationary ring arranged at an inside of said rotary ring, the inside stationary ring having a seal surface sealingly contacting and sliding with said seal surface of the rotary ring at an inside end of the rotary ring;
    an outside stationary ring arranged at an outside of said rotary ring, the outside stationary ring having a seal surface sealingly contacting and sliding with said seal surface of the rotary ring at an outside end of the rotary ring;
    a seal case axially-movable supporting said inside stationary ring; and
    a seal cover into which said rotary shaft is penetrated, mounted sealingly on said outer surface of said apparatus having said rotary shaft with a gasket interposed between an inside end surface thereof and said outer surface of said apparatus, the seal cover having an inner bore, the seal cover accommodating said seal case, said inside stationary ring, said rotary ring and said outside stationary ring in said inner bore, and the seal cover axially-movably supporting said outside stationary ring at an outside end of the apparatus;

wherein said seal cover is provided with a flange portion having a groove for getting through a member for fixing the seal cover on an outer surface of said apparatus, the groove being cut in from an outer diameter toward an inner diameter of said rotary shaft; and wherein said seal case is radially fixed to said seal cover and installed at the inside end of said seal cover by a screw member installed so as to reach said inner bore from an inner diameter side of said groove toward further inner diameter side.

2. The double mechanical seal device as set forth in claim 1, wherein at least any one of a radial width of a sliding surface between said seal surface of said inside stationary ring and said seal surface at the inside of said rotary ring, and a radial width of a sliding surface between said seal surface of said outside stationary ring and said surface at the outside of said rotary ring is formed to be 3 mm or less.

3. The double mechanical seal device as set forth in claim 2, wherein at least any one of balance values of said inside stationary ring and said outside stationary ring is 70% to 130%.

4. The double mechanical seal device as set forth in claim 3, wherein said inside stationary ring has an O-ring between an outer circumferential surface of the inside stationary ring and an inner circumferential surface of said seal case at a predetermined place of a back position against said seal surface of the inside stationary ring, and the inside stationary ring is installed so that spaces of both sides of said seal surface are sealed by the O-ring at the position against the seal surface;

a diameter of said outer circumferential surface of said inside stationary ring on which said O-ring is attached is approximately same as an inner diameter of a sliding surface between said seal surface of the inside stationary ring and said seal surface of said rotary ring; and a diameter of said inner circumferential surface of said seal case on which said O-ring is attached is approximately same as an outer diameter of a sliding surface between said seal surface of the inside stationary ring and said seal surface of said rotary ring.

5. The double mechanical seal device as set forth in claim 3, wherein said outside stationary ring has an O-ring between an outer circumferential surface of the outside stationary ring and an inner circumferential surface of said seal cover at a predetermined place of a back position against said seal surface of the outside stationary ring, and the outside stationary ring is installed so that spaces of both sides of said seal surface are sealed by the O-ring at the back position against the seal surface;

a diameter of said outer circumferential surface of said outside stationary ring on which said O-ring is attached is approximately same as an inner diameter of a sliding surface between said seal surface of the outside stationary ring and said seal surface of said rotary ring; and a diameter of said inner circumferential surface of said seal cover on which said O-ring is attached is approximately same as an outer diameter of a sliding surface between said seal surface of the outside stationary ring and said seal surface of said rotary ring.

6. The double mechanical seal device as set forth in claim 1, wherein at least one of a combination of materials of said inside stationary ring and said rotary ring, and a combination of materials of said outside stationary ring and said rotary ring is a combination of silicon carbide (SiC) and silicon carbide (SiC), a combination of carbon and silicon carbide (SiC), a combination of cemented carbide and cemented carbide, or a combination of carbon and cemented carbide.

* * * * *